United States Patent [19]

Freeman

[11] Patent Number: 5,060,063
[45] Date of Patent: Oct. 22, 1991

[54] VIEWING AND ILLUMINATING VIDEO PROBE WITH VIEWING MEANS FOR SIMULTANEOUSLY VIEWING OBJECT AND DEVICE IMAGES ALONG VIEWING AXIS AND TRANSLATING THEM ALONG OPTICAL AXIS

[75] Inventor: Gary T. Freeman, Beverly, Mass.

[73] Assignee: MPM Corporation, Franklin, Mass.

[21] Appl. No.: 559,622

[22] Filed: Jul. 30, 1990

[51] Int. Cl.⁵ .................. H04W 7/18; H04W 7/00
[52] U.S. Cl. .................. 358/101; 358/106; 358/107; 358/100; 250/458.1
[58] Field of Search .............. 358/101, 100, 98, 106, 358/107, 225; 350/174, 173, 96.18; 250/458.1

[56] References Cited

U.S. PATENT DOCUMENTS

| | | | |
|---|---|---|---|
| 4,608,494 | 8/1986 | Kobayashi et al. | 250/458.1 |
| 4,636,846 | 1/1986 | Villarreal | 358/101 |
| 4,672,437 | 6/1987 | Casper | 358/101 |
| 4,686,565 | 8/1987 | Ando | 358/101 |
| 4,725,883 | 2/1988 | Clark, Jr. et al. | 358/100 |
| 4,737,845 | 4/1988 | Susuki et al. | 358/101 |
| 4,820,975 | 4/1989 | Diggle | 358/107 |
| 4,858,001 | 8/1989 | Milbank et al. | 358/225 |
| 4,924,304 | 5/1990 | Freeman | 358/106 |

*Primary Examiner*—James J. Groody
*Assistant Examiner*—Glenton B. Burgess
*Attorney, Agent, or Firm*—Fish & Richardson

[57] ABSTRACT

An illuminated video probe in an aligning system for similtaneously viewing an object and a device acting on the object while illuminating the object and the device acting on the object directly along their respective viewing axes. A first optical beamsplitter and adjacent mirror surface act to simultaneously translate the object and device images to the video probe optical axis. A second optical beamsplitter, adjacent light source, and opaque surface act to illuminate the object along the viewing axis without causing light to project back toward the video probe.

21 Claims, 3 Drawing Sheets

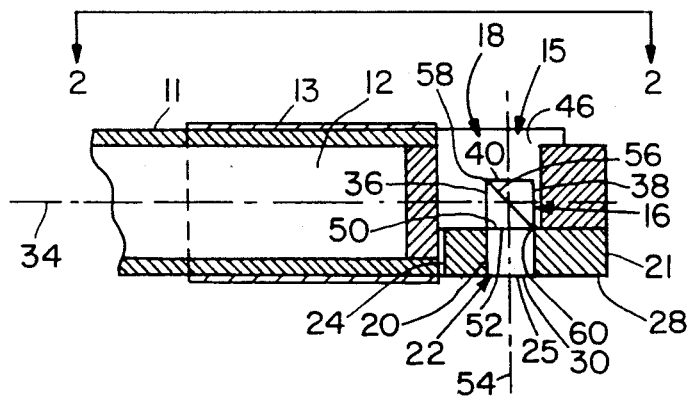
Fig. 3
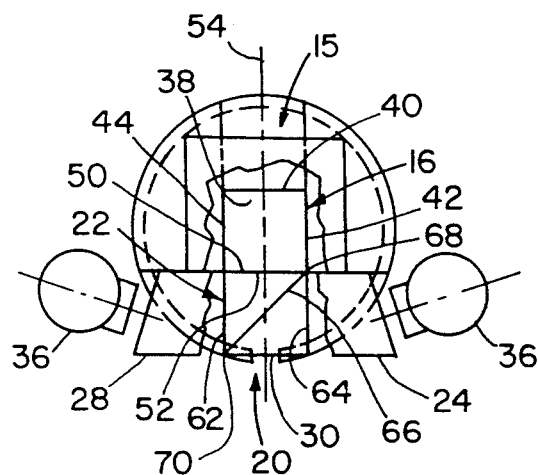
Fig. 4
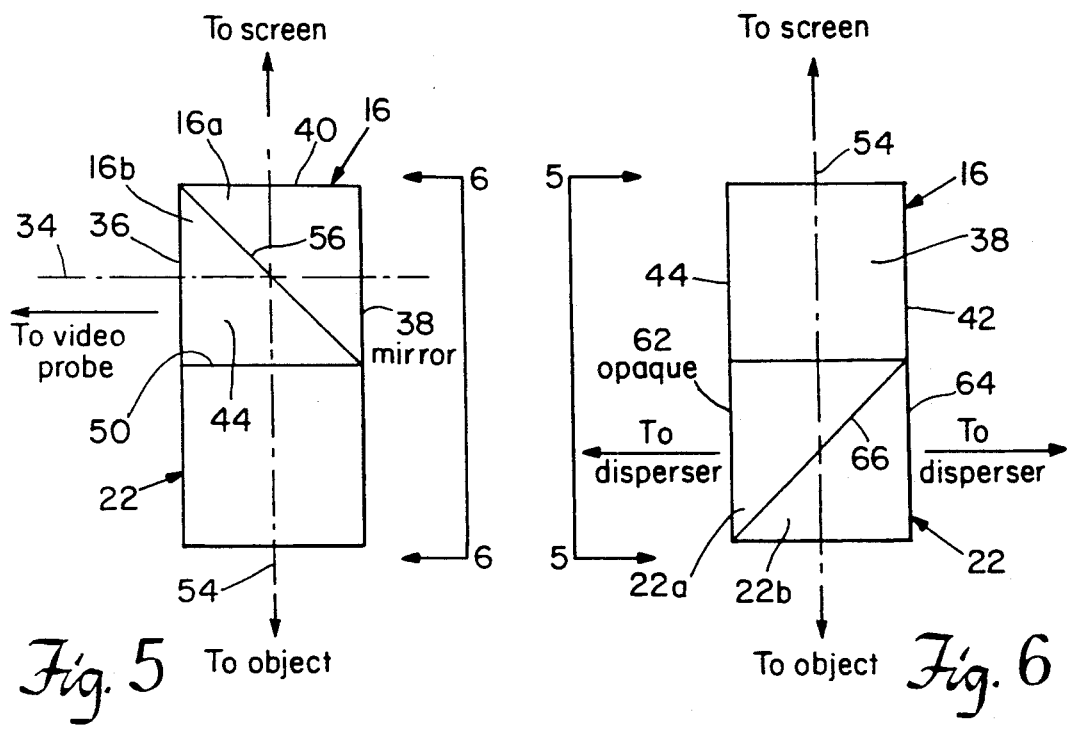
Fig. 5
Fig. 6

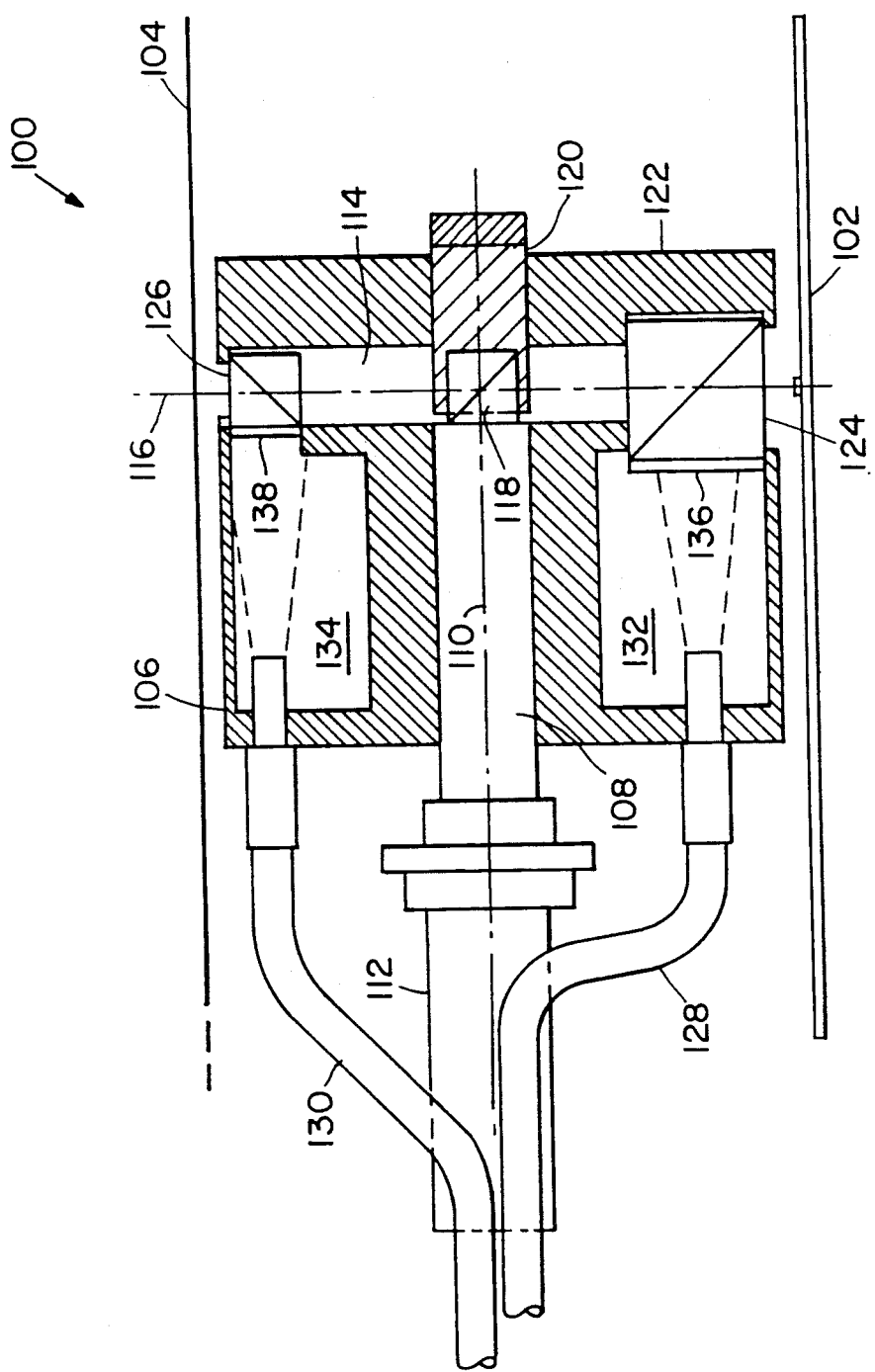
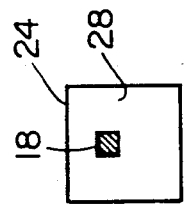
Fig. 7 PRIOR ART
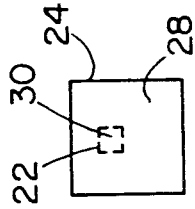
Fig. 8
Fig. 9

VIEWING AND ILLUMINATING VIDEO PROBE WITH VIEWING MEANS FOR SIMULTANEOUSLY VIEWING OBJECT AND DEVICE IMAGES ALONG VIEWING AXIS AND TRANSLATING THEM ALONG OPTICAL AXIS

The present invention relates in general to aligning and more particularly concerns novel apparatus for illuminating and viewing the object to be acted upon at particular locations while simultaneously viewing the device acting upon the object at those locations. A specific embodiment of the invention facilitates aligning a stencil to surface mount circuit boards.

BACKGROUND OF THE INVENTION

A typical screen printer is the commercially available ASP-24 automated screen printer available from MPM Corp., 10 Forge Park, Franklin, Mass. 02038, incorporated herein by reference.

A prior art screen printer includes a camera that looks between the board and the screen, reciprocating to view the board on the screen by physically rotating a viewing mechanism such as a mirror tube at the end of a video probe. Such a device is described in U.S. Pat. Application No. 07/116,490, incorporated herein by reference. Illumination of the circuit board to be viewed is accomplished by a pair of fiber optic light sources which run parallel to the video probe to provide a low angle of incidence lighting of the circuit board, thereby reducing reflected glare from the highly reflective circuit board traces into the video probe. The low angle of incidence lighting is accomplished by surrounding the video probe viewing port with a light disperser, thereby creating an illuminated planar surface with a hole disposed in it to accommodate the viewing port.

It is an important object of this invention to provide improved apparatus for illuminating and viewing an object, to be repeatedly acted upon at one or more points by a device, and the device.

SUMMARY OF THE INVENTION

Another object of the invention is to eliminate rotation of the movable video probe to alternately view the acting device, such as the screen or stencil, typically above, and the object to be acted upon, such as a circuit board, typically below. The video probe disclosed by this invention is configured with means for viewing both the acting device and the object simultaneously, with a full field of view of the device and the object, without rotation.

Another aspect of the invention provides a solid planar illuminated surface without a hole for the viewing port apparent in the illumination plane, thus illuminating the object without any apparent illumination voids in the viewed reflecting surface of the object.

Numerous other features, objects and advantages of the invention will become apparent from the following specifications when read in connection with the accompanying drawings in which:

BRIEF DESCRIPTION OF THE DRAWING

FIG. 3 is a side cross-sectional view of the video probe with viewing and illuminating cubic beamsplitter, and light disperser;

FIG. 4 is a cut-away end view of the video probe with viewing and illuminating cubic beamsplitters, light disperser and fiber optic light sources;

FIG. 5 is a side view of the viewing and illuminating beamsplitters shown in relationship to one another;

FIG. 6 is a distal end view of the viewing and illuminating beamsplitter shown in relationship to one another;

FIG. 7 is a view of the planar illuminated surface of the prior art with imaging cubic beamsplitter visible in the illuminated surface;

FIG. 8 is a view of the planar illuminated surface of this invention with illuminating cubic beamsplitter shown in outline in the illuminated surface; and FIG. 9 is a cross sectional view of another preferred embodiment of the video probe of this invention featuring illumination of the object and the device.

DETAILED DESCRIPTION

Figure 1:
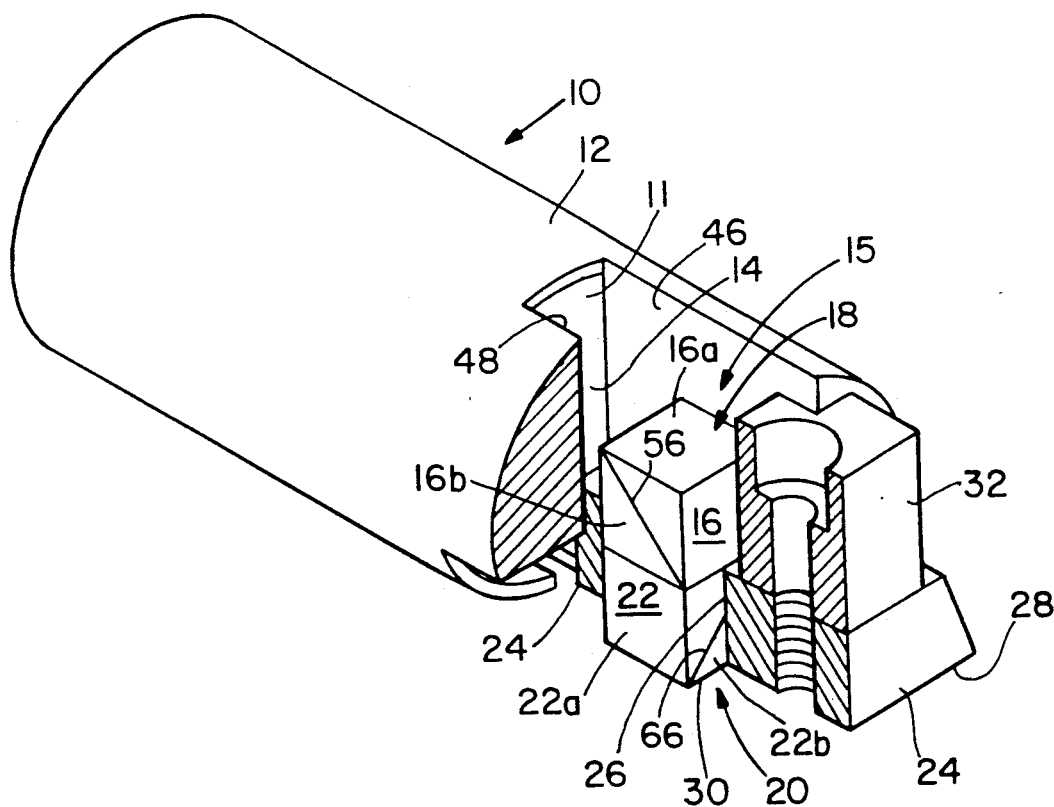
FIG. 1 is a perspective cut-away view of the video probe with viewing and illuminating cubic beamsplitters, and light disperser according to the invention.

With reference now to FIG. 1, there is shown a perspective view of a preferred embodiment of an illuminated video probe 10 according to this invention, including a video probe 11 and a cylindrical beamsplitter housing 12 surrounding a central viewing bore 14 of the video probe. Central viewing bore 14 is positioned between video probe 11 at one end, and a beamsplitter viewing channel 15, substantially perpendicular to the central bore, at the other end. Beamsplitter viewing channel 15 has an upper viewing portion 18 above the center of the central bore, and a lower viewing portion 20 below the center of the central bore.

An imaging cubic beamsplitter 16 is centrally located within viewing channel 15, partially in upper portion 18 and partially in lower portion 20 of the viewing channel. The center of the imaging beamsplitter is aligned with the center of central bore 14.

An illuminating cubic beamsplitter 22 is positioned adjacent to and below imaging beamsplitter 16 in the lower portion 20 of viewing channel 15. A light disperser 24 surrounds illuminating beamsplitter 22, with each of the disperser's four internal surfaces 26 (one shown) coextensive with each of the four adjacent sides of the illuminating beamsplitter 22. The planar bottom surface 28 of light disperser 24 is disposed in the same plane as the planar bottom face 30 of illuminating beamsplitter 22. An aluminum end cap 32 is disposed above light disperser 24 and adjacent to imaging beamsplitter 16 to seal the end of the video probe.

Figure 2:
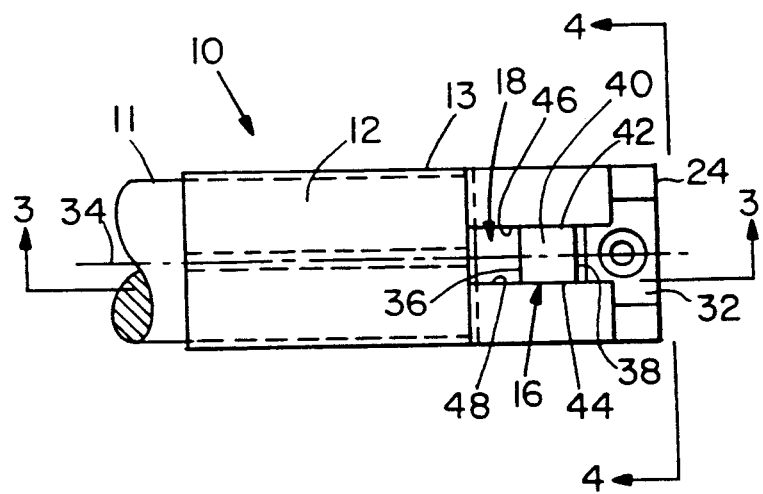
FIG. 2 is a plan view of the video probe with imaging cubic beamsplitter.

FIG. 2 shows a plan view of beamsplitter housing 12 mounted on the distal end portion 13 of video probe 11. Central bore 14 has an optical axis 34 coaxial with the central bore. Imaging beamsplitter 16 is mounted in viewing channel 15 with its proximal face 36 (closest to the video probe) and its distal face 38 (farthest from the video probe) perpendicular to optical axis 34. Optical axis 34 intersects both proximal face 36 and distal face 38 in the center of their respective planar surfaces.

The upper portion 18 of viewing channel 15 is defined by two parallel viewing channel walls 46 and 48 having planar wall surfaces. Walls 46 and 48 are disposed equidistantly on either side of optical axis 34 with their respective planar surfaces parallel to the optical axis. The top face 40 of the imaging beamsplitter 16 is shown located in the upper viewing channel 18 with imaging beamsplitter side faces 42 and 44 adjacent to and parallel with viewing channel walls 46 and 48 respectively.

FIG. 3 shows a side cross-sectional view of the video probe taken in the plane of imaging beamsplitter side face 44. Viewing channel 15 has a central imaging axis 54 which is perpendicular to, and intersects with, video probe optical imaging axis 34. Illuminating beamsplitter 22, mounted directly below imaging beamsplitter 16, has a top face 52 aligned with the bottom face 50 of the imaging beamsplitter. Central imaging axis 54 intersects imaging beamsplitter top face 40 and bottom face 50, and illuminating beamsplitter top face 52 and bottom face 30 perpendicular to, and in the center of, their respective planar surfaces.

Imaging beamsplitter 16 has a planar beamsplitting surface 56 which internally traverses the beamsplitter cube from a corner edge 58 formed by the intersection of proximal face 36 and top face 40, to a corner edge 60 formed by the intersection of distal face 38 and bottom face 50. Beamsplitting surface 56 thereby bisects imaging beamsplitter 16 into two prism-shaped halves 16a and 16b (FIG. 5). The imaging beamsplitter is disposed in the viewing channel such that the center of beamsplitting surface 56 coincides with the intersection of video probe optical axis 34 and central imaging axis 54.

Referring to FIG. 4, illuminating beamsplitter 22 also has a planar beamsplitting surface 66, which internally traverses the beamsplitter cube from the corner edge 68 formed by the intersection of the side face 64 and top face 52, to the corner edge 70 formed by the intersection of side face 62 and bottom face 30. The illuminating beamsplitter is disposed in the viewing channel such that the central imaging axis 54 passes through the center of beamsplitting surface 66.

Illuminating beamsplitter 22 is mounted within a light disperser 24 which is disposed in the bottom portion of viewing channel 15. Fiber optic light sources 36 are disposed on opposite sides of and adjacent to the light disperser to uniformly illuminate the disperser. Light disperser 24 surrounds the sides of the illuminating beamsplitter such that side face 64, in particular, is adjacent to and uniformly illuminated by the light disperser. The light disperser also has a planar bottom surface 28, which is coplanar with illuminating beamsplitter bottom face 30, to illuminate the object from a direction slightly off the viewing axis.

FIGS. 5 and 6 show two isolated views of the imaging and illuminating beamsplitters 16 and 22 as they relate to one another in the video probe. FIG. 5 is a side view while FIG. 6 is a view from the distal end of the video probe. Referring to FIG. 5, imaging beamsplitter 16, as described above, is fashioned out of two prism shaped halves of optical glass 16a and 16b. A typical optical glass cube used for the imaging beamsplitter 16 is commercially available from Precision Optics Corporation, 22 East Broadway, Gardner, Mass. 01440, as part numbers 8280-600 and 8280-601 for the cube halves 16a and 16b, respectively, incorporated herein by reference. The cube is typically 6.00 mm+/−0.05 mm on each side. The beamsplitter surface 56 lies at the interface where the two prism-shaped pieces 16a and 16b mate, and is formed by coating one of the mating surfaces with a low loss 50% light reflective/50% light transmissive (50—50) optical material. Thus, light incident on beamsplitter surface 56 is half transmitted through the surface and half reflected by the surface. Other transmission to reflection ratios may be used dependent on the relative light transmission desired.

Similarly, the illuminating beamsplitter 22 (FIG. 6) is formed from two mating prism shaped pieces 22a and 22b. The beamsplitter surface 66 is also formed by coating one of the mating surfaces with the same 50—50 optical material. A typical optical glass cube used for illuminating beamsplitter 22 is also commercially available from Precision Optics Corporation as part numbers 8280-602 and 8280-603 for the cube halves 22a and 22b, respectively, incorporated herein by reference. The cube is typically 6.00 mm+/−0.10 mm on each side. As with beamsplitter surface 56, beamsplitter surface 66 half transmits and half reflects light incident on the surface. Again, other transmission to reflection ratios may be used dependent on the relative light transmission desired.

Referring again to FIG. 5, imaging beamsplitter distal face 38 is coated with a high reflector optical mirror finish and painted over with a protective backing to form a reflecting surface for light incident on the face 38 from inside the beamsplitter. The mirror coated face combined with beamsplitter surface 56 provides simultaneous viewing along optical axis 34 (i.e., by the video probe) of the images entering the beamsplitter along viewing axis 54 through bottom face 50 (the object image) and top face 40 (the screen image).

The object image travels along viewing axis 54, passes through illuminating beamsplitter 22, enters imaging beamsplitter 16 through bottom face 50, and impinges on beamsplitting surface 56. Beamsplitting surface 56 reflects 50% of the light from the object image along optical axis 34 toward the video probe. The remaining 50% of the light from the object image is transmitted through beamsplitting surface 56, along viewing axis 54, and through top face 40, and is lost.

The screen image travels along viewing axis 54, enters imaging beamsplitter through top face 40 and impinges in on beamsplitting surface 56. Beamsplitting surface 56 transmits 50% of the light from the screen image through the beamsplitting surface, along viewing axis 54, through bottom face 50, and into illuminating beamsplitter 22, where it is lost. The remaining 50% of the light from the screen image is reflected by beamsplitter surface 56 along optical axis 34 toward mirror coated face 38. Mirror face 38 reflects the image back toward beamsplitting surface 56, also along optical axis 34. Beamsplitting Surface 56 transmits 50% of the reflected image along the optical axis toward the video probe. The remaining 50% of the light from the reflected image is reflected by beamsplitter surface 56 back along the viewing axis 54, through top face 40 and is lost.

Referring now to FIG. 6, illuminating beamsplitter side face 62 is covered with an opaque, light absorbing coating. This coating prevents light from adjacent light disperser 24 from entering the illuminating beamsplitter through side face 62 and being reflected by beamsplitter surface 66 along viewing axis 54 into the imaging beamsplitter and eventually along the optical axis 34. Light from light disperser 24 is, however, allowed to enter the illuminating beamsplitter through side 64 and impinge on beamsplitting surface 66. Beamsplitting surface 66 reflects 50% of the light, entering through side 64, along viewing axis 54 to illuminate the object. The remaining 50% of the light entering through side 64 is transmitted by beamsplitting surface 66 and is absorbed by opaque wall 62. Thus, illuminating light is directed along the viewing axis toward the object, but not along the viewing axis toward the imaging beamsplitter and the video probe.

Another preferred embodiment replaces the two optical glass cube beamsplitters 16 and 22 with appropriate half-silvered mirrors arranged in the same planes as beamsplitter surfaces 56 and 66. Additionally, an appropriate mirror surface is arranged to replace mirror face 38, and an appropriate opaque surface is arranged to replace opaque face 62.

FIG. 7 shows the prior art illumination surface 28 as seen by the object to be illuminated. Viewing channel 18 contains the imaging beamsplitter 16, but not the illuminating beamsplitter 22. The result is planar illumination of the object with an illumination void caused by the viewing channel 18. For highly reflective objects, such as the mirror-like metallic traces of a circuit board, the illumination void would show as a dark area in a critical central portion of the object image, the portion directly along the viewing axis. Also, although the illumination is at a very small angle of incidence with respect to the viewing axis 54, shadows tend to be cast into the darkened area of the illumination void which distorts the small geometries being imaged in that area. This distortion causes imaging errors which in turn causes alignment errors by the alignment apparatus.

FIG. 8 shows the illumination surface 28 of this invention, as seen by the object to be illuminated. Illuminating beamsplitter 22 (broken line) fills the viewing channel 18 illumination void with light directed from the light disperser 24 as described above. Light is directed toward the object along the viewing axis 54 without being directed back toward the video probe 11 along the optical axis 34. Illuminating beamsplitter bottom face 30 is planar with disperser surface 28 to project what appears to be a solid plane of light onto the object. The result is a reflection from the object which contains no lighting voids. Additionally no shadows are caused to be cast on the object surface since the illuminating light includes light directed along the viewing axis 54. Therefore, the object is easier to image in the critical central viewing portion along the viewing axis 54, and errors due to small geometry shadows are eliminated.

FIG. 9 shows a preferred embodiment 100 of a video probe for illuminating both an object 102 (e.g., a printed circuit board) and a device working on the object 104 (e.g., solder paste stencil) while simultaneously viewing both. Video probe 100 has a housing 106 with a central viewing bore 108 having an optical axis 110 coaxial with a video camera 112. Housing 106 also has a viewing channel 114 having a central viewing axis 116 perpendicular to optical axis 110. An imaging beamsplitter 118 (equivalent to imaging beamsplitter 16 described above) is centered at the intersection of the optical axis 110 and viewing axis 116 so that the video camera may simultaneously view the object 102 and the device acting on the object 104, in the manner described above with reference to FIG. 5. An alignment knob 120 is disposed through the end 122 of the probe housing and holds the imaging beamsplitter to allow small rotational adjustment of the beamsplitter about the optical axis to attain alignment of the optical system during manufacturing.

An object illuminating beamsplitter 124 (equivalent to illuminating beamsplitter 22 described above) is disposed in viewing channel 114 between viewing beamsplitter 118 and object 102 to direct illumination toward the object along viewing axis 116 in a manner described above with reference to FIG. 6. Similarly, a device illuminating beamsplitter 126 (also equivalent to illuminating beamsplitter 22) is disposed in the viewing channel between the Viewing beamsplitter and device 104 to direct illumination toward the device along the viewing axis. Object illuminating beamsplitter 124 is larger than device illuminating beamsplitter 126 to equalize the path length the object and device images travel through the glass medium of the beamsplitters. That is, the longer path the object image travels through object illuminating beamsplitter 124 compensates for the longer path the device image must travel through viewing beamsplitter 118 to be reflected along optical axis 110 toward video probe 112. In this case the larger object illuminating beamsplitter provides a larger area of illumination on the object than the smaller device illuminating beamsplitter provides on the device. A variety of illumination area sizes for both the object and device are possible by adjusting the size of their respective illuminating beamsplitters.

Separate fiber optic light sources 128, 130, supply light to illuminating beamsplitters 124, 126 respectively. Each fiber optic source terminates in a closed cavity 132, 134 in probe housing 106 and illuminates a light disperser 136, 138 adjacent the respective illuminating beamsplitter 124, 126. Each disperser produces an even white tone across the adjacent face of the illuminating beamsplitter, which in turn produces a uniform illumination of the object or the device.

There has been described novel apparatus and techniques for viewing and illuminating. It is evident that those skilled in the art may now make numerous other uses and modifications of and departures from the apparatus and techniques herein disclosed without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Viewing and illuminating apparatus comprising,
    a video probe, having an optical axis, arranged to be placed between an object and a device acting on the object to view an object image and a device image along a viewing axis;
    viewing means, disposed in said video probe, for simultaneously viewing the object image and the device image along said viewing axis and translating said images along said optical axis; and
    at least one illumination means disposed in said video probe for directing illumination along said viewing axis away from said viewing means.

2. The apparatus of claim 1 wherein said illuminating means directs illumination toward the object along the viewing axis.

3. The apparatus of claim 1 wherein said illuminating means directs illumination toward the device along the viewing axis.

4. The apparatus of claim 1 comprising
    a first illuminating means for directing illumination toward the object along the viewing axis; and
    a second illuminating means for directing illumination toward the device along the viewing axis.

5. The apparatus of claim 1 wherein said viewing means comprises,
    an optical beamsplitter surface; and
    an optical mirror surface,
    wherein said beamsplitter directs a first image toward said video probe along said optical axis, and said beamsplitter directs a second image toward said optical mirror along said optical axis, and said optical mirror reflects said second image along said optical axis through said beamsplitter toward said video probe.

6. The apparatus of claim 5 wherein said first image comprises the object image, and said second image comprises the device image.

7. The apparatus of claim 5 wherein said first image comprises the device image, and said second image comprises the object image.

8. The apparatus of claim 5 wherein,
said optical beamsplitter comprises an internal surface of a first cube of optical glass, said internal surface covered with a partially light-transmissive, partially light-reflective, coating; and
said mirror surface is disposed on a face of said first cube of optical glass, said face covered with a light reflective mirror coating and a protective backing over said mirror coating.

9. The apparatus of claim 8 wherein said coating is substantially 50% light-transmissive, 50% light-reflective.

10. The apparatus of claim 5 wherein said first beamsplitter comprises a partially-silvered mirror.

11. The apparatus of claim 1 wherein said illumination means comprises,
an optical beamsplitter surface;
an opaque light absorbing surface; and
an illumination source incident on one side of said optical beamsplitter surface;
wherein said beamsplitter directs light from said illumination source along said viewing axis away from said viewing means, and said opaque surface absorbs light from said illumination source passing through said beamsplitter surface.

12. The apparatus of claim 11 wherein
said beamsplitter surface comprises an internal surface of a cube of optical glass, said internal surface covered with a partially light-transmissive, partially light-reflective, coating; and
said opaque light absorbing surface is disposed on a first face of said first cube of optical glass, said first face covered with a light absorbing coating to prevent reflections.

13. The apparatus of claim 12 wherein said illumination source comprises a uniformly illuminated planar surface coincident with a second face of said cube of optical glass, said second face being opposite said first face.

14. The apparatus of claim 13 wherein said illumination source comprises a light disperser fed by a light source.

15. The apparatus of claim 14 wherein said light source comprises fiber optics.

16. The apparatus of claim 12 wherein said coating is substantially 50% light-transmissive, 50% light-reflective.

17. The apparatus of claim 11 wherein said beamsplitter comprises a partially-silvered mirror.

18. Viewing and illuminating apparatus comprising,
a video probe, having an optical axis, arranged to be placed between an object and a device acting on the object to view an object image and a device image along a viewing axis;
viewing means, disposed in said video probe, for simultaneously viewing the object image and the device image along said viewing axis and translating said images along said optical axis;
a first illumination means disposed in said video probe for directing illumination along said viewing axis toward the object and away from said viewing means; and
a second illumination means disposed in said video probe for directing illumination along said viewing axis toward the device and away from said viewing means.

19. The apparatus of claim 18 wherein said viewing means comprises,
an optical beamsplitter surface; and
an optical mirror surface,
wherein said beamsplitter directs the object image toward said video probe along said optical axis, and said beamsplitter directs the device image toward said optical mirror along said optical axis, and said optical mirror reflects said device image along said optical axis through said beamsplitter toward said video probe.

20. The apparatus of claim 18 wherein said viewing means comprises,
an optical beamsplitter surface; and
an optical mirror surface,
wherein said beamsplitter directs the device image toward said video probe along said optical axis, and said beamsplitter directs the object image toward said optical mirror along said optical axis, and said optical mirror reflects said object image along said optical axis through said beamsplitter toward said video probe.

21. The apparatus of claim 18 wherein said first and second illumination means comprises,
an optical beamsplitter surface;
an opaque light absorbing surface; and
an illumination source incident on one side of said optical beamsplitter surface;
wherein said beamsplitter directs light from said illumination source along said viewing axis away from said viewing means, and said opaque surface absorbs light from said illumination source passing through said beamsplitter surface.

* * * * *